US010063122B2

(12) United States Patent
Reddmann

(10) Patent No.: US 10,063,122 B2
(45) Date of Patent: Aug. 28, 2018

(54) MINIATURE DRIVE FOR CAR LOCKS WITH AN AXIAL STOP FOR THE MOTOR SPINDLE

(71) Applicant: Kiekert Aktiengesellschaft, Heiligenhaus (DE)

(72) Inventor: Uwe Reddmann, Essen (DE)

(73) Assignee: Kiekert Aktiengesellschaft, Heiligenhaus (DE)

(*) Notice: Subject to any disclaimer, the term of this patent is extended or adjusted under 35 U.S.C. 154(b) by 336 days.

(21) Appl. No.: 14/787,782

(22) PCT Filed: Apr. 16, 2014

(86) PCT No.: PCT/DE2014/000198
§ 371 (c)(1),
(2) Date: Oct. 29, 2015

(87) PCT Pub. No.: WO2014/173387
PCT Pub. Date: Oct. 30, 2014

(65) Prior Publication Data
US 2016/0087507 A1 Mar. 24, 2016

(30) Foreign Application Priority Data

Apr. 26, 2013 (DE) .......................... 10 2013 007 272

(51) Int. Cl.
*H02K 1/04* (2006.01)
*H02K 7/08* (2006.01)
(Continued)

(52) U.S. Cl.
CPC ............. *H02K 7/081* (2013.01); *E05B 81/06* (2013.01); *E05B 85/02* (2013.01); *H02K 5/02* (2013.01);
(Continued)

(58) Field of Classification Search
CPC .......... H02K 7/081; H02K 5/02; H02K 5/161; H02K 7/1166; E05B 81/06; E05B 85/02; F16C 17/08; F16C 35/02; F16C 2380/27
(Continued)

(56) References Cited

U.S. PATENT DOCUMENTS 5,564,308 A * 10/1996 Hoshikawa ............. E05B 81/25
292/201
8,117,937 B2 * 2/2012 Konomoto ............. E05B 77/36
74/425
(Continued)

FOREIGN PATENT DOCUMENTS

EP 0394512 A1 10/1990
EP 0133527 B2 2/1991
(Continued)

OTHER PUBLICATIONS

Machine Translation of EP0133527B2 by Lexis Nexis Total Patent on Nov. 19, 2015.
(Continued)

*Primary Examiner* — Forrest M Phillips
(74) *Attorney, Agent, or Firm* — Woodard, Emhardt, Moriarty, McNett & Henry LLP

(57) ABSTRACT

For miniature drives which are used in particular in car locks, the axial play of the motor spindle is prevented, or is at least greatly restricted, by the necessary axial stop and also the further motor stop being assigned to the housing cover of the housing. When the housing cover is placed onto the housing casing, said axial stops are inserted into corresponding guides in such a manner that said axial stops subsequently not only restrict the play of the motor spindle and ensure an always uniformly secure arrangement of the motor housing in the housing, but at the same time also make possible the substantially simpler production of the required bearing bore. Said bearing bore and the associated aperture
(Continued)

are produced from the outer side of the housing casing during the injection molding.

16 Claims, 3 Drawing Sheets

(51) Int. Cl.
    *E05B 81/06*     (2014.01)
    *E05B 85/02*     (2014.01)
    *H02K 7/116*     (2006.01)
    *H02K 5/02*     (2006.01)
    *H02K 5/16*     (2006.01)
    *F16C 35/02*     (2006.01)
    *F16C 17/08*     (2006.01)

(52) U.S. Cl.
    CPC ........... *H02K 5/161* (2013.01); *H02K 7/1166* (2013.01); *F16C 17/08* (2013.01); *F16C 35/02* (2013.01); *F16C 2380/27* (2013.01)

(58) Field of Classification Search
    USPC ............................. 310/43; 74/89.14; 292/201
    See application file for complete search history.

(56) References Cited

U.S. PATENT DOCUMENTS

| | | | | |
|---|---|---|---|---|
| 8,757,680 | B2* | 6/2014 | Byun | ..................... E05B 81/00 |
| | | | | 292/201 |
| 9,435,400 | B2* | 9/2016 | Cheung | ............... F16H 57/0025 |
| 9,441,402 | B2* | 9/2016 | Larsen | ................ E05B 15/0086 |
| 2008/0203737 | A1* | 8/2008 | Tomaszewski | ......... E05B 77/26 |
| | | | | 292/216 |
| 2010/0270816 | A1* | 10/2010 | Yuan | ................... E05B 47/0012 |
| | | | | 292/201 |
| 2015/0076838 | A1* | 3/2015 | Rajagopal | ............... E05B 81/06 |
| | | | | 292/201 |
| 2016/0115714 | A1* | 4/2016 | Pan | ......................... E05B 51/02 |
| | | | | 292/201 |
| 2016/0145928 | A1* | 5/2016 | Shimizu | ................ E05F 15/611 |
| | | | | 292/201 |

FOREIGN PATENT DOCUMENTS

| | | |
|---|---|---|
| EP | 0764099 B1 | 5/1999 |
| EP | 1101652 B1 | 2/2004 |
| EP | 2182148 A2 | 5/2010 |

OTHER PUBLICATIONS

Machine Translation of EP0394512A1 by Lexis Nexis Total Patent on Nov. 19, 2015.
Machine Translation of EP0764099B1 by Lexis Nexis Total Patent on Nov. 19, 2015.

* cited by examiner

MINIATURE DRIVE FOR CAR LOCKS WITH AN AXIAL STOP FOR THE MOTOR SPINDLE

BACKGROUND

The invention relates to a miniature drive and preferably an electric miniature drive for car locks such as side door locks, tailgate locks or closing aids with a housing containing the miniature drive and a worm gear and consisting of a housing casing and housing cover, in which the motor spindle of the miniature drive is supported on the housing by means of a bearing bore and is secured by an axial stop.

In such miniature drives, used preferably in locks, side door locks, tailgate locks or closing aids, the motors are mounted in a housing, with the motor spindle being at least axially supported on the housing or on a provided ridge wall. EP 0 133 527 B2 discloses an arrangement in which the shaft or drive axis of such a miniature drive is mounted in a plain bearing. The tip of this motor spindle is seated in a disk which can also be regarded as an axial stop. Also EP 0 394 512 A1 uses such a disk for mounting or limiting the insertion depth of the motor spindle, with in both cases, the arrangement of the disk and the additional support requiring elaborate measures. In EP 1 101 652 B1, the axial play of the motor spindle is limited in a similar manner, with this axial restriction requiring a separate screwing-in or insertion device, leading to additional work during the production of the housings. Lastly, EP 0 764 099 B1 discloses a respective electric drive motor with the motor spindle or their tip being mounted in a type of stopper, also at the same time serving to restrict the axial movement of the motor spindle. Instead of said stopper, also a leaf-like spring element is used, requiring special fixing in the housing. The common factor for all these different types of motor spindle bearings is that the components required for mounting the motor spindle either require a separate work step during production, are a separate component that have to be arranged in a certain position of the housing or for which during injection molding of the housing or in this case of the housing casing, respective cylindrical sliders have to be provided in the tool that must be arranged from the inside of the housing. This requires a considerable tooling effort so that the motor as a whole is difficult to mount and also requires special measures, in order to guarantee the precise position of the miniature drive.

SUMMARY

The invention has the task of significantly simplifying assembly of the miniature drive and ensuring accurate positioning within the housing.

The invention solves the task by the axial stop assigned to the bearing bore or other fixing being produced from the housing cover and the hole for the bearing bore from the outer side of the housing casing.

As the axial stop assigned to the bearing bore does not have to be arranged inside the housing casing, the required bearing bore can be easily produced from the outer side of the housing casing. The axial stop itself is assigned to the housing cover which only comes into effect or use when the housing cover is placed onto the housing casing, i.e. at the time of the final assembly. A further advantage is that the miniature drive or the respective motor can now be easily inserted and axially displaced to then be fixed into place by the axial to in order to constantly maintain the same position.

In an expedient embodiment of the invention, the axial stop is assigned to the motor spindle and the axial stop of the motor to the housing cover. This clarifies that the two axial stops required for securing the motor of the miniature drive, only become effective when the housing cover is fitted allowing the remaining preparatory work required for fixing the motor to be carried out without the axial stops impeding this work.

The unchanged position of the axial stops at or in the housing cover is ensured by the fact that the axial stops are designed to form a single unit with the housing cover. They are thus produced during injection molding of the housing cover so that always the same arrangement and design can be guaranteed.

Whilst in state of the art embodiments, the cylindrical slider has to become effective from inside the housing casings, the invention provides for the bearing bore to be produced from the outside of the housing casing during injection molding of the housing casing by means of a cylindrical slider in the tool. In this way, the required bearing bore or required aperture is much easier to produce and the simpler positioning also ensures that the position and form of the molding of the bearing bore and of the aperture bearing bore are always the same.

As mentioned above, the axial stops, i.e. the axial stop assigned to the bearing bore as well as the axial motor stop only become effective upon fitting of the housing cover. In order to ensure accurate guidance and thus also positioning, the axial stops of the invention are designed as a double web or double molded part containing the web of the housing casings. Naturally only the part of this double web assigned to the motor or motor spindle operates as axial stop. The other part of the web ensures the correct insertion and positioning and provides additional support for the assembled housing.

According to the invention, the axial stops are also secured by the corresponding webs of the housing casing and housing cover and fixing bolts connecting the latter. As a result, the axial stops already assume their position when the housing cover is fitted with this position then being secured by the fixing bolts as the housing casing and housing cover are connected by these fixing bolts.

In order to facilitate insertion of the double webs around the web inside the housing casing and to ensure that the position is always the same, the invention provides for the recess accommodating the axial stop in the area of the bearing bore to contain chamfered edges. This provides a type of insertion funnel into which the respective web or axial stop is inserted so that also the axial stop of the motor can be positioned correctly. No special measures or particular care is required for this work as the axial stop automatically slides into the correct position.

In order to ensure a certain pretensioning for the motor spindle or to accurately fix the entire miniature drive in its position, the side of the axial stop facing the tip of the motor spindle contains a slope that defines a wedge. When sliding the axial stop or the respective web into the recess, the tip of the motor spindle is slid towards the axial stop of the motor, allowing for a certain pretensioning to be achieved.

Said pretensioning can further be aided by the axial stop containing a longitudinal slot, producing a spring effect. This offers the option, albeit limited, of moving the motor spindle into this position by slightly pressing on in. The spring effect can be influenced depending on the shape of the longitudinal slot.

The constant seat of the motor spindle and thus also a reliable guidance is further ensured by the fact that the side of the axial stop assigned to the tip of the motor spindle contains a recess accommodating the tip of the motor spindle.

A particular advantage of the invention is that especially for electrical miniature drives, used in car locks, the manufacture of, in particular, the required axial stops, is simplified considerably. The axial stops, i.e. the axial stop acting on the motor spindle and the actual axial stop of the motor are assigned to the housing cover and are parts of the housing cover, so that they do not impede the manufacture of the bearing bore and of the aperture for the bearing bore. As a result, the bearing bore and the required aperture can be produced from the outer side of the housing casing and in particular during injection molding of the housing casing. The required axial stops are then expediently part of the housing cover, i.e. are created as part of the injection molding of the housing cover so that when the housing cover is placed on the housing, casing they are automatically moved into the stop position for the motor and motor spindle because of their arrangement and shape. No special measures are required for this especially if the seat of the axial stops or the axial stop provided for the bearing bore contain funnel-shaped recesses. The respective axial stop or the web in the housing cover forming the stop is moved into and is then also retained in the optimum position in particular by means of the easily installed fixing bolts.

Further details and advantages of the object of the invention are disclosed in the below description of the respective drawing, showing a preferred embodiment with the required details and parts, in which:

DETAILED DESCRIPTION OF THE DRAWINGS

Figure 1:
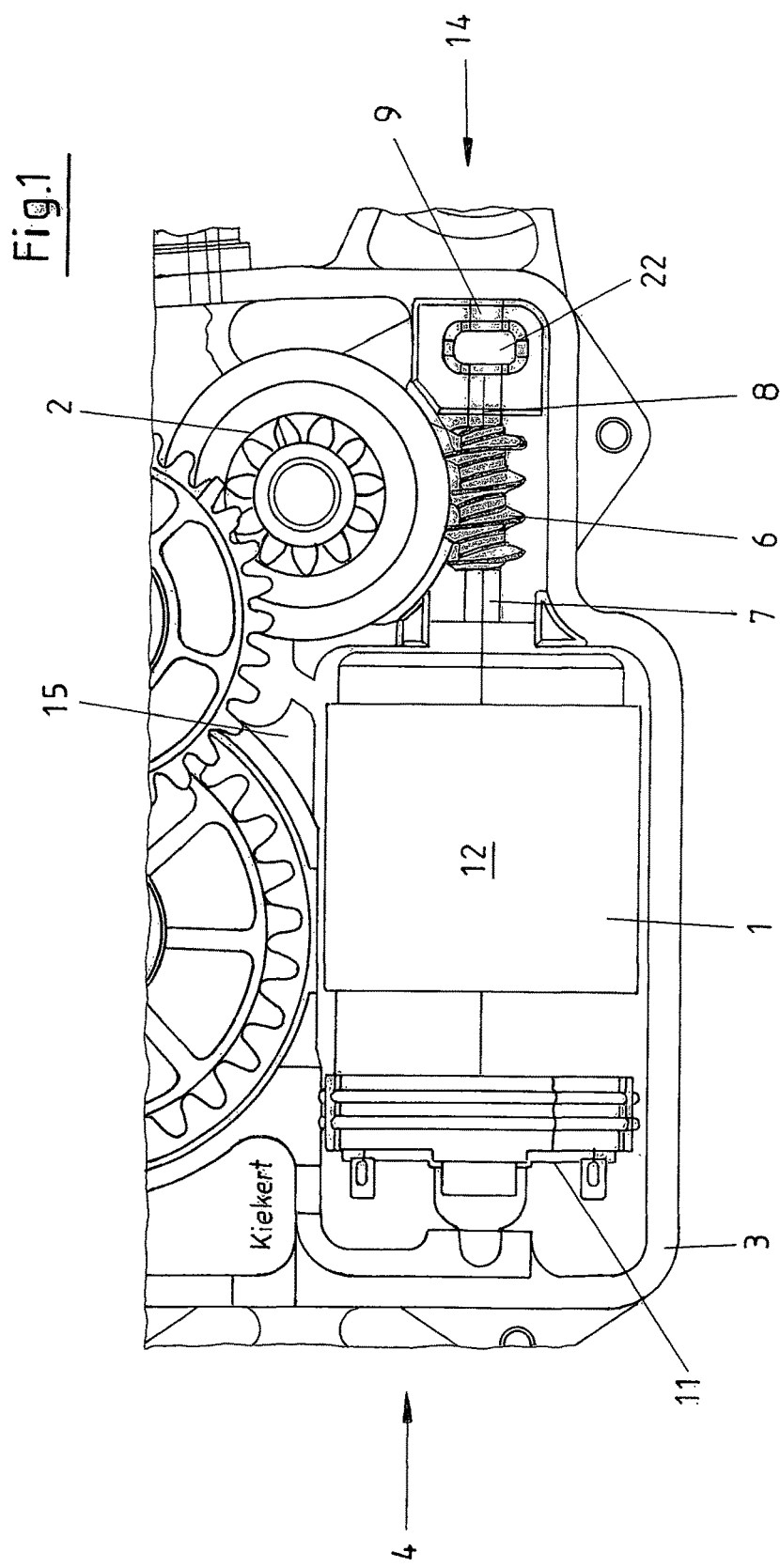
FIG. 1 shows a partial top view of a miniature drive.

FIG. 1 provides a top view of a miniature drive 1, with the housing 3 shown in an open state. As a result, the internal worm gear 2 and miniature drive 1 are clearly visible. The miniature drive 1 is positioned in a respective recess of the housing casing 4, with the motor spindle 7 being able to engage the worm gear 2 with its worm shaft 6. The tip of the motor spindle 7 is inserted in a bearing bore created from the external side 14 which can easily be accessed and created through a respective aperture 9. The required axial stop has still not been installed at this stage and must be slid into recess 22 from the top. The required axial stop of the motor is indicated by numeral 11 on the end of the motor housing 12 opposite the motor spindle 7. The housing casing 4 contains respective partial areas, subdividing the interior 15 of the housing casing 4, which are designed for accommodating the different gears of the worm gear 2 and of the motor housing.

Figure 2:
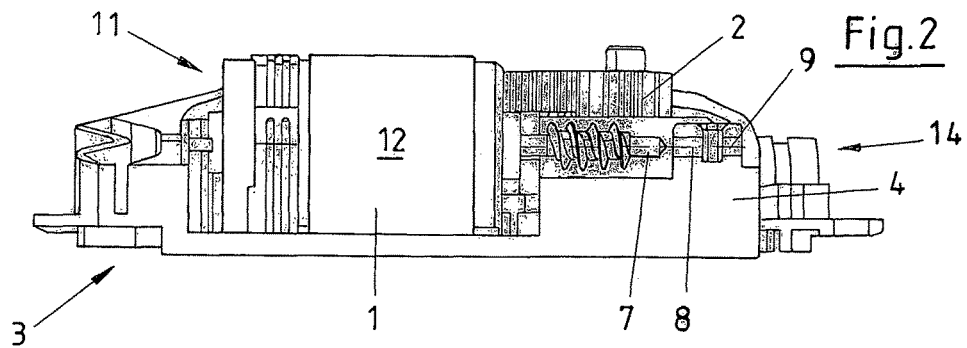
FIG. 2 shows a side view of the miniature drive with the motor already inserted in the housing casing

FIG. 2 shows a side view of the miniature drive 1 with the housing 3, in which the worm gear 2 and the motor housing 12 are visible. The motor housing 12 is inserted in a respective recess of the interior 15 and can be displaced in the direction of the bearing bore 8. In order to maintain the respective position, axial stops 10 and 11 must be provided on both sides, which at this point are not visible and do not exist as yet, as they are assigned to the housing cover 5, not shown.

Figure 3:
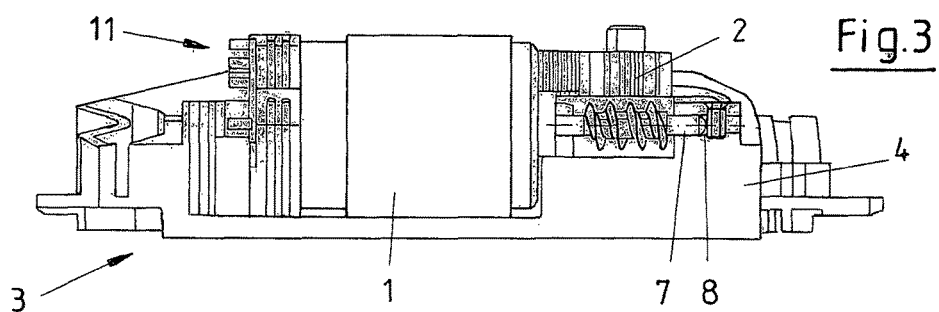
FIG. 3 shows the miniature drive with the motor spindle already inserted in the bearing bore
Figure 4:
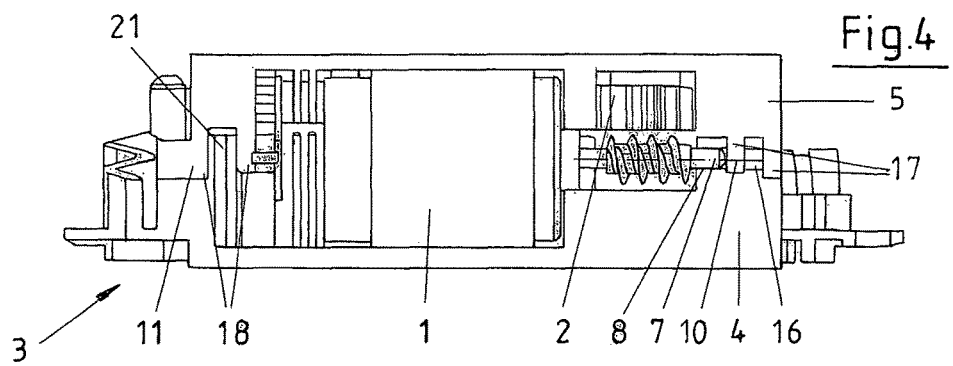
FIG. 4 shows a housing casing with a respective housing cover and thus a miniature drive (motor) held on both sides by an axial stop
Figure 5:
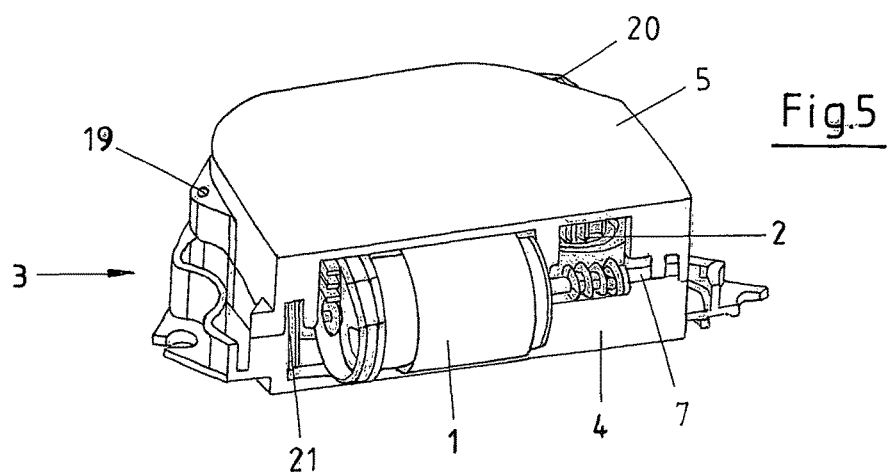
FIG. 5 shows the working position of FIG. 4 in a slanted position with fixing bolts.

Upon reaching the position of FIG. 2, the motor housing 12 can be moved in the direction of the bearing bore 8 until the front part of the motor spindle 7 is fully supported in the bearing bore 8. This is apparent from FIG. 3. In order to secure the attained position of the miniature drive 1 or of the motor housing 12 and motor spindle 7, the housing cover 5 is placed on the housing casing as shown in FIG. 4. The figure shows that a web 16 formed in a housing casing 4 serves as guidance for the double web 17 of the housing cover 5 so that the double web 17, serving as an axial stop 10 always reaches the exact position required for securely supporting and positioning the miniature drive. On the opposite side of the housing 3 or of the housing cover 5 the figure shows the axial motor stop 11 also designed as a double web 18 and which when slid on, surrounds the web 21 in the housing casing 4 and thus also always assumes the same position. FIG. 4 and FIG. 5 show that after placing the housing cover 5 on the housing casing 4, the precise positioning of the motor housing 12 and the motor spindle 7 is secured by tightening of the fixing bolts 19 provided on both sides of the housing 3.

This simple and reliable insertion of the axial stop 10, designed as a double web 17 is facilitated by the fact that the recess 22 in the housing casing 4 contains beveled edges 23, 24. This creates a type of insertion funnel 25, automatically guiding the housing cover 5 with the respective double webs 17, 18 in the right position.

Figure 6:
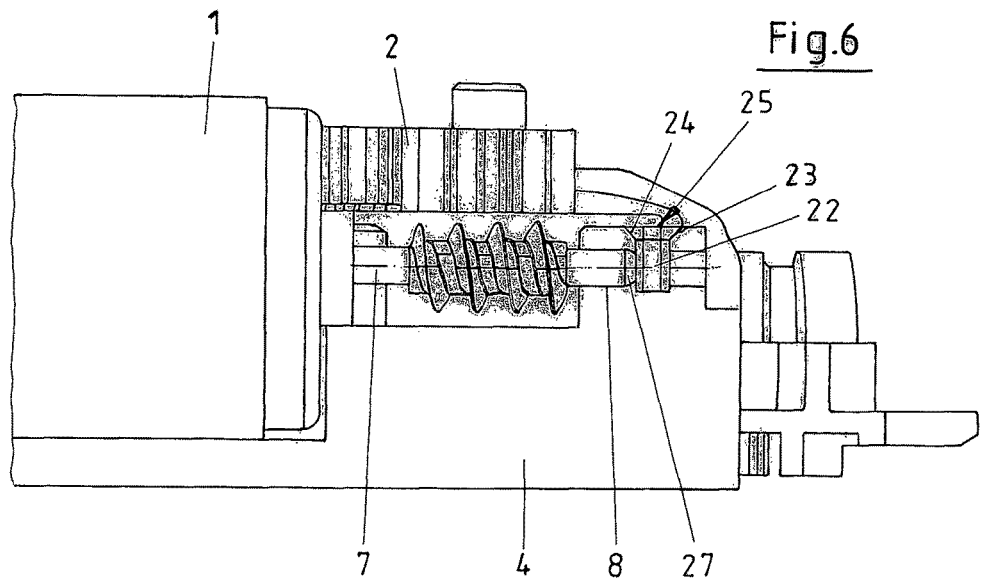
FIG. 6 shows an enlarged representation of the installation position after the motor spindle has been inserted in the bearing bore.
Figure 7:
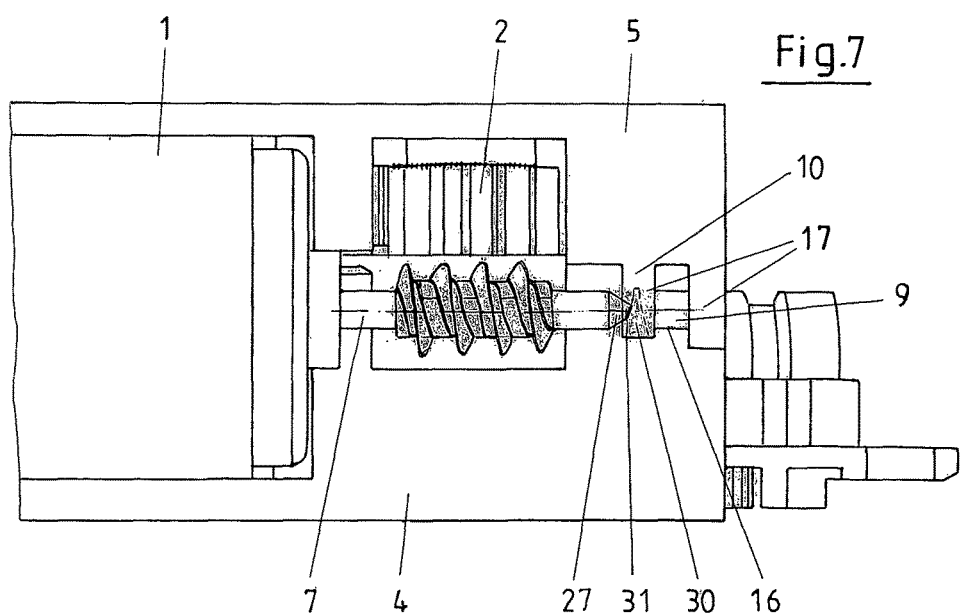
FIG. 7 shows the position of the miniature drive of FIG. 6 with the housing cover placed on the housing and thus insertion of the axial stop provided for the motor spindle and FIG. 8 shows a diagrammatically represented position with an axle stop containing a chamfered section in front of the motor spindle.

Whilst in FIG. 6 the housing cover 5 has not as yet been placed on the housing casing, FIG. 7 shows the respective further position, with the axial play of the motor housing 12 being effectively limited or largely prevented by the axial motor stop 11 (not shown) and the axial stop 10 assigned to the motor spindle 7.

According to FIG. 7, side 28 of the axial stop 10 contains a recess 31 accommodating the respective tip 27 of the motor spindle 7 and guiding it securely. The respective part of the double web 17 also contains a longitudinal gap 30 by means of which the respective axial movement of the motor housing 12 can be resiliently supported.

Figure 8:
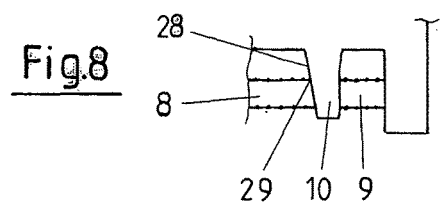

Lastly, FIG. 8 shows a special design of the part of the double web 17 serving as an axial stop 10, with side 28 containing a chamfered section 29 so that when inserted in the recess 22 the motor housing 12 and the motor spindle 7 are clamped together.

All said characteristics and also those only shown in the figures are on their own or in combination regarded as essential parts of the invention.

The invention claimed is:

1. A miniature drive for car locks and side door locks, tailgate locks or closing aids with a housing accommodating the miniature drive and a worm gear and consisting of a housing casing and housing cover, in which a motor spindle of the miniature drive is supported on the housing by means of a bearing bore and is also secured by an axial stop, wherein the axial stop assigned to the bearing bore is created in the housing cover and an aperture for the bearing bore from an external side of the housing casing; wherein the axial stop of the motor spindle and an axial motor stop are each assigned to the housing cover; and wherein the axial stops are each designed as a double web surrounding a web of the housing casing.

2. The miniature drive according to claim 1, wherein the axial stops are designed to form a single unit together with the housing cover.

3. The miniature drive according to claim 1, wherein during injection molding of the housing casing, the bearing bore is generated from an outer side of the housing casing, using a cylindrical slider in the tool.

4. The miniature drive according to claim 1, wherein the axial stops are secured by corresponding webs of the housing casing and housing cover and fixing bolts connecting the latter.

5. The miniature drive according to claim 4, wherein the recess accommodating the axial stop in the area of the bearing bore contains beveled edges.

6. The miniature drive according to claim 5, wherein the side of the axial stop facing a tip of the motor spindle contains a slope defining a wedge.

7. The miniature drive according to claim 6, wherein the axial stop contains a longitudinal slot producing a spring effect.

8. The miniature drive according to claim 7, wherein the side of the axial stop assigned to the tip of the motor spindle contains a recess accommodating the tip of the motor spindle.

9. The miniature drive according to claim 1, wherein the axial stops are secured by corresponding webs of the housing casing and housing cover and fixing bolts connecting the latter.

10. The miniature drive according to claim 1, wherein the recess accommodating the axial stop in the area of the bearing bore contains beveled edges.

11. The miniature drive according to claim 1, wherein the side of the axial stop facing a tip of the motor spindle contains a slope defining a wedge.

12. The miniature drive according to claim 1, wherein the axial stop contains a longitudinal slot producing a spring effect.

13. The miniature drive according to claim 12, wherein the side of the axial stop assigned to the tip of the motor spindle contains a recess accommodating the tip of the motor spindle.

14. A miniature drive for car locks and side door locks, tailgate locks or closing aids with a housing accommodating the miniature drive and a worm gear and consisting of a housing casing and housing cover, in which a motor spindle of the miniature drive is supported on the housing by means of a bearing bore and is also secured by an axial stop and an aperture for the bearing bore from an external side of the housing casing; wherein the axial stop of the motor spindle and an axial motor stop are each assigned to the housing cover; and wherein the recess accommodating the axial stop in the area of the bearing bore contains beveled edges.

15. An apparatus comprising:
a miniature drive comprising a motor spindle;
a worm gear rotationally coupled to the motor spindle;
a housing casing defining a bearing bore and an aperture for the bearing bore extending from an external side of the housing casing, wherein the motor spindle extends through and is supported by the bearing bore; and
a housing cover comprising an axial stop of the motor spindle and an axial motor stop.

16. The apparatus of claim 15, wherein the axial stop of the motor spindle obstructs the aperture for the bearing bore when the housing cover covers the housing casing.

* * * * *